United States Patent
He et al.

(10) Patent No.: US 8,162,184 B2
(45) Date of Patent: Apr. 24, 2012

(54) FOLLOWER PACKING UNIT FOR GREASE GUNS AND THE LIKE

(75) Inventors: Canlong He, St. Peters, MO (US); Paul G. Conley, St. Charles, MO (US)

(73) Assignee: Lincoln Industrial Corporation, St. Louis, MO (US)

( * ) Notice: Subject to any disclaimer, the term of this patent is extended or adjusted under 35 U.S.C. 154(b) by 413 days.

(21) Appl. No.: 12/470,863

(22) Filed: May 22, 2009

(65) Prior Publication Data

US 2010/0294808 A1 Nov. 25, 2010

(51) Int. Cl.
*G01F 11/00* (2006.01)
(52) U.S. Cl. ............. 222/256; 92/255; 92/258; 222/386
(58) Field of Classification Search .......... 222/256–262, 222/386; 92/255–258
See application file for complete search history.

(56) References Cited

U.S. PATENT DOCUMENTS

| | | | |
|---|---|---|---|
| 1,645,890 A * | 10/1927 | Zerk | 222/257 |
| 2,124,077 A | 7/1938 | Ostendorf | |
| 2,174,421 A | 9/1939 | Krannak | |
| 2,409,619 A | 10/1946 | Fitch | |
| 2,505,839 A | 5/1950 | Scovell | |
| 2,886,215 A | 5/1959 | Klein | |
| 2,941,854 A | 6/1960 | Jernander | |
| 2,978,151 A | 4/1961 | Sundholm | |
| 3,038,768 A | 6/1962 | Kludt | |
| 3,038,776 A | 6/1962 | Chance | |
| 3,059,819 A | 10/1962 | Sundholm | |
| 3,187,074 A | 6/1965 | Morin | |
| 3,187,959 A | 6/1965 | Morehouse | |
| 3,286,887 A | 11/1966 | Sundholm | |
| 3,501,063 A | 3/1970 | Sundholm | |
| 3,612,359 A * | 10/1971 | Sundholm | 222/199 |
| 4,007,494 A | 2/1977 | Sauer | |
| 4,083,428 A | 4/1978 | Ness | |
| 4,247,023 A | 1/1981 | Shew | |
| 4,560,095 A | 12/1985 | Shew | |

OTHER PUBLICATIONS

Fig. 1 of pending U.S. Appl. No. 12/470,863.

* cited by examiner

*Primary Examiner* — Jason Boeckmann
(74) *Attorney, Agent, or Firm* — Senniger Powers LLP

(57) ABSTRACT

An improved follower packing unit for a grease gun is disclosed. The unit includes a hollow annular body of elastomeric material having a front wall, an annular side wall and a rear wall defining a cavity in the body. Rigid front and back structural supports rigidly support the front and rear walls of the elastomeric seal. The elastomeric seal and the front and back structural supports are fastened together to prevent separation and to form a unitary follower structure movable as a unit on a follower rod. The annular side wall of the elastomeric seal is resiliently deformable under pressure in a radial direction for sealing tightly against an interior surface of the barrel of the grease gun or against the interior surface of a tubular cartridge loaded in the barrel of the gun.

13 Claims, 15 Drawing Sheets

FOLLOWER PACKING UNIT FOR GREASE GUNS AND THE LIKE

FIELD OF INVENTION

This invention relates to a sealing mechanism for lubrication equipment and, more particularly, to a follower packing unit for a grease gun.

BACKGROUND OF INVENTION

In grease gun applications, lubricant is loaded into the barrel of the gun using a variety of different methods. In a first method, the barrel of the gun is loaded with lubricant using one of several bulk loading techniques. In one such technique, referred to as pressure loading, lubricant is pumped into the barrel through the dispensing head of the gun from a source of lubricant under high pressure. In another bulk loading technique, referred to as suction loading, the follower assembly of the gun is retracted manually to create a suction pressure in the barrel which draws lubricant from a suitable source into the barrel. In a third technique, bulk loading is accomplished simply by hand-packing the barrel with heavy lubricant.

In addition to bulk loading, the barrel of the gun can be loaded with a lubricant cartridge that consists of a sleeve open at both ends and pre-packed with lubricant. With the pump head end of the lubrication gun removed, the cartridge is slid into the gun barrel and the end replaced.

With this background, it has proven difficult to construct a follower assembly that will adequately seal with respect to both the inner diameter of the gun barrel, in the case of bulk loading, and the inner diameter of the cartridge, in the case of cartridge loading, since the barrel and cartridge have different inner diameters. In the past, this problem has been approached in a variety of ways, none of which have been totally satisfactory.

U.S. Pat. No. 4,247,023 describes a follower assembly that seals against the barrel of the lubrication gun or against the smaller diameter of a lubrication cartridge positioned in the barrel. During manual priming, a follower rod moves the follower body forward by engagement between a projection on the rod and a back-up plate behind the follower body, and rearward by engagement of a washer carried by the rod with the front of the follower body.

U.S. Pat. No. 3,038,768 describes a follower packing adapted for use in a grease gun loaded either with bulk grease or grease in a cartridge. The follower is adapted for easy entry into a cartridge and to make a tight seal against the cartridge to prevent by-passing of grease around the follower rod.

The devices described in the above patents have drawbacks. For example, in U.S. Pat. No. 4,247,023, the use of an engagement washer on the follower rod disrupts the sealing surface between the follower rod and seal assembly when the user is pulling the grease follower in a rearward direction away from the pump head to prepare the grease gun for refill. Eventually, after repeated applications, this disruption causes by-pass of grease from the front portion of the follower assembly to the back portion of the follower assembly. This is an undesirable because any grease in the back portion of the follower assembly is wasted.

In the case of U.S. Pat. No. 3,038,768, the sealing ability of the follower seal denoted 53 against the grease tube denoted 1 or cartridge denoted T is limited when moving the grease follower rod forward for priming purposes. Users complain there is by-pass of grease between the follower seal and the grease tube or cartridge causing undesirable situations as grease is wasted.

Another grease gun of conventional design is shown in FIG. 1. The gun has a follower rod 1, an elastomeric seal 3 forming a cavity, a rear support 5 and a two-piece front support 7. The rear support 5 is not fastened to the elastomeric seal 3 and is only retained by a spring 15 against the elastomeric seal. When there is a need to prime the grease gun after loading of grease, an engagement pin 17 on the follower rod 1 is positioned in contact with a back surface 21 of the front support. A pushing force on the follower rod 6 acts against the back surface 23 of the elastomeric seal 3, causing distortion of the seal. This distortion allows grease from the lubricant chamber to by-pass the seal.

There is a need, therefore, for a lubrication gun having a follower assembly providing a more effective seal against the inside surface of the barrel, in the case of bulk loading of lubricant in the barrel, and against the inside surface of a cartridge of grease in the barrel, in the case of cartridge loading.

SUMMARY OF INVENTION

In general, this invention is directed to a lubricating gun comprising a barrel for holding either lubricant in bulk or a tubular cartridge containing lubricant. The lubricating gun also includes a follower packing unit in the barrel, and a follower rod for moving the follower packing unit in the barrel along a longitudinal axis of the barrel. The follower packing unit comprises an elastomeric seal comprising a hollow annular body of elastomeric material having a front wall, an annular side wall and a rear wall defining a cavity in the body. A first opening in the front wall allows entry of lubricant into the cavity under pressure. A second opening in the rear wall is aligned with the first opening such that the follower rod extends through both openings. The rear wall is configured at the second opening for sealing engagement with the follower rod. A rigid back structural support is provided for rigidly supporting the rear wall of the elastomeric seal, and a rigid front structural support is provided for rigidly supporting the front wall of the elastomeric seal. The front and back structural supports have openings therein aligned with the first and second openings in the elastomeric seal for receiving the follower rod. One or more fasteners are provided for fastening the elastomeric seal, the front structural support and the back structural support to one another in a manner preventing separation such that the elastomeric seal and front and back structural supports form a unitary follower structure movable as a unit in the barrel. The annular side wall of the elastomeric seal is resiliently deformable under said pressure in a radial direction for sealing against an interior surface of the barrel or the tubular cartridge.

In another aspect, this invention is directed to a follower packing assembly incorporating a follower packing unit and follower rod of the type described above.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION

Figure 1:
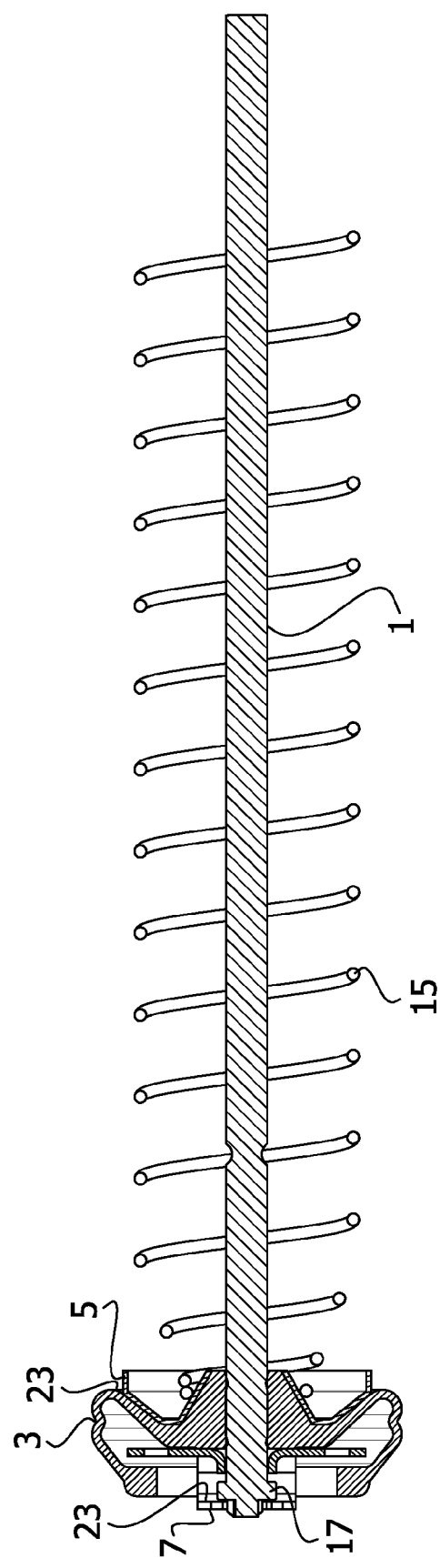
FIG. 1 is a longitudinal section of a prior art grease gun.
Figure 2:
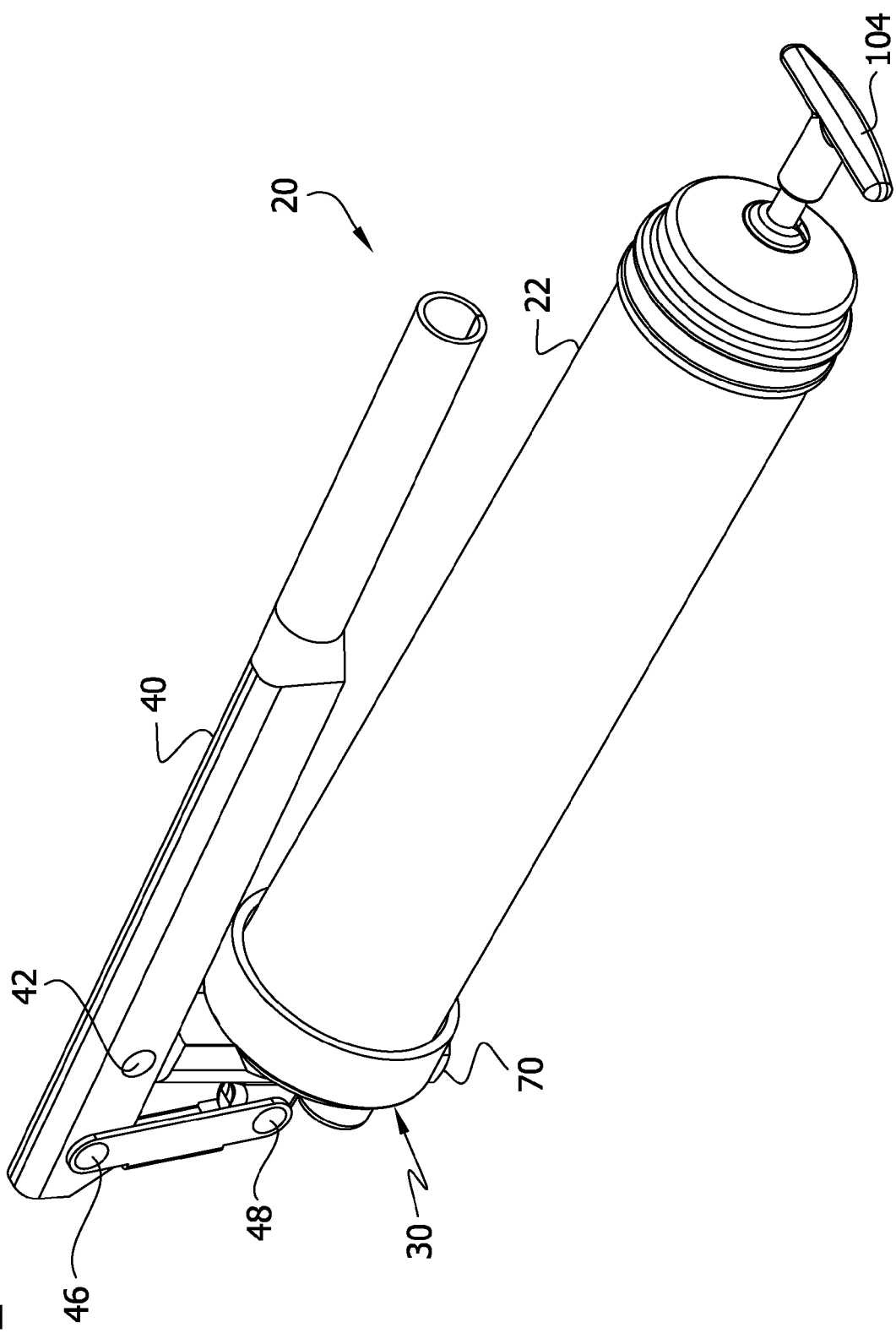
FIG. 2 is a perspective of a grease gun of the present invention.
Figure 3:
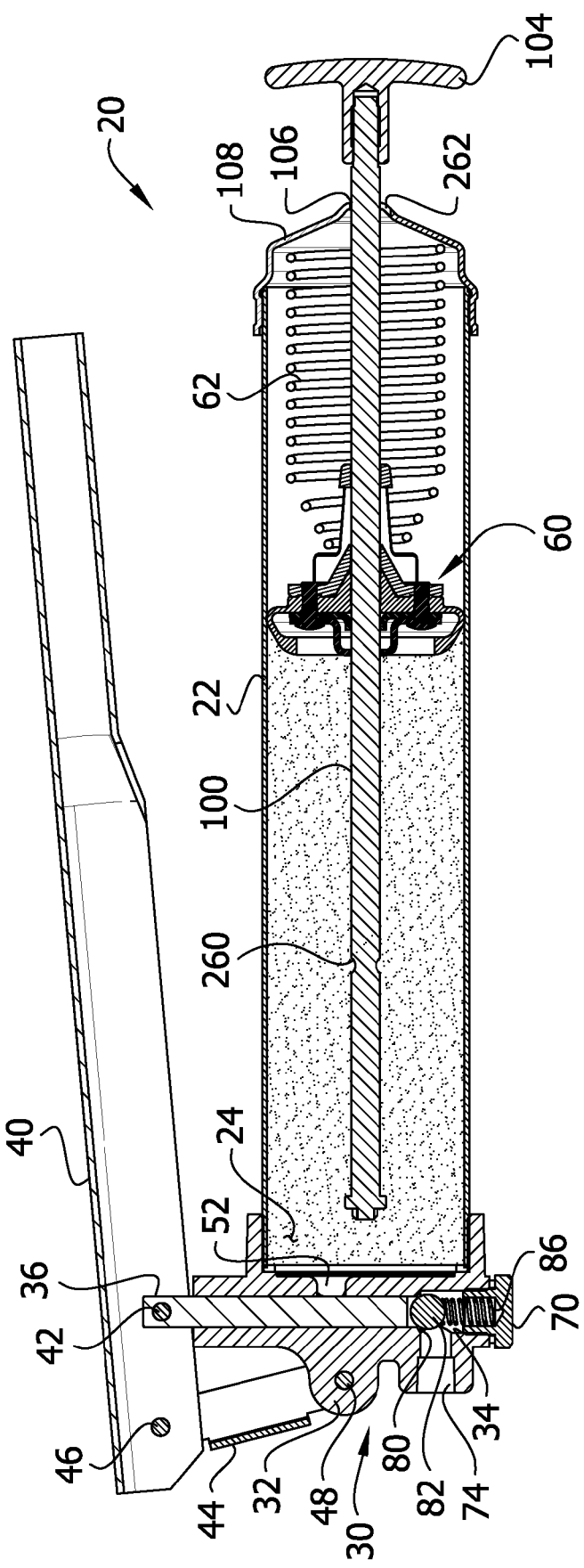
FIG. 3 is a longitudinal section of the grease gun of FIG. 2, illustrating a follower packing unit urging a quantity of bulk grease toward an outlet of the gun.
Figure 4:
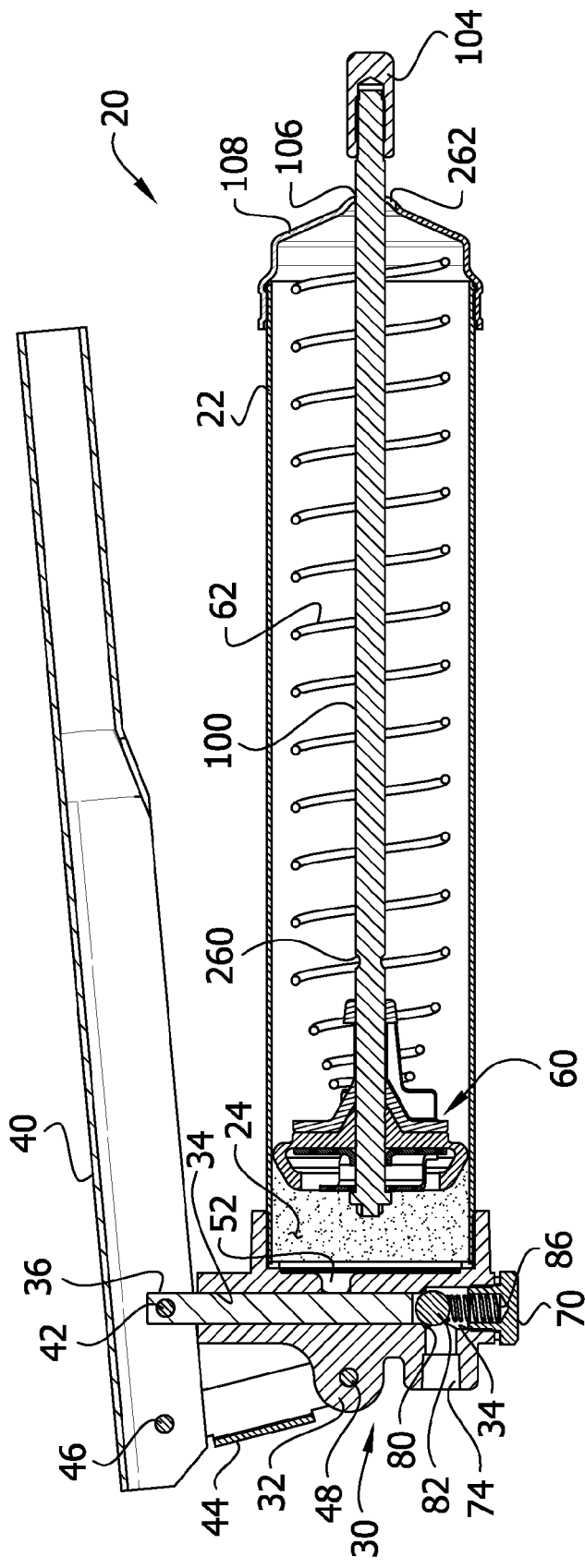
FIG. 4 is a view similar to FIG. 3 but showing the follower packing unit of the gun nearer the pump end of the barrel.
Figure 5:
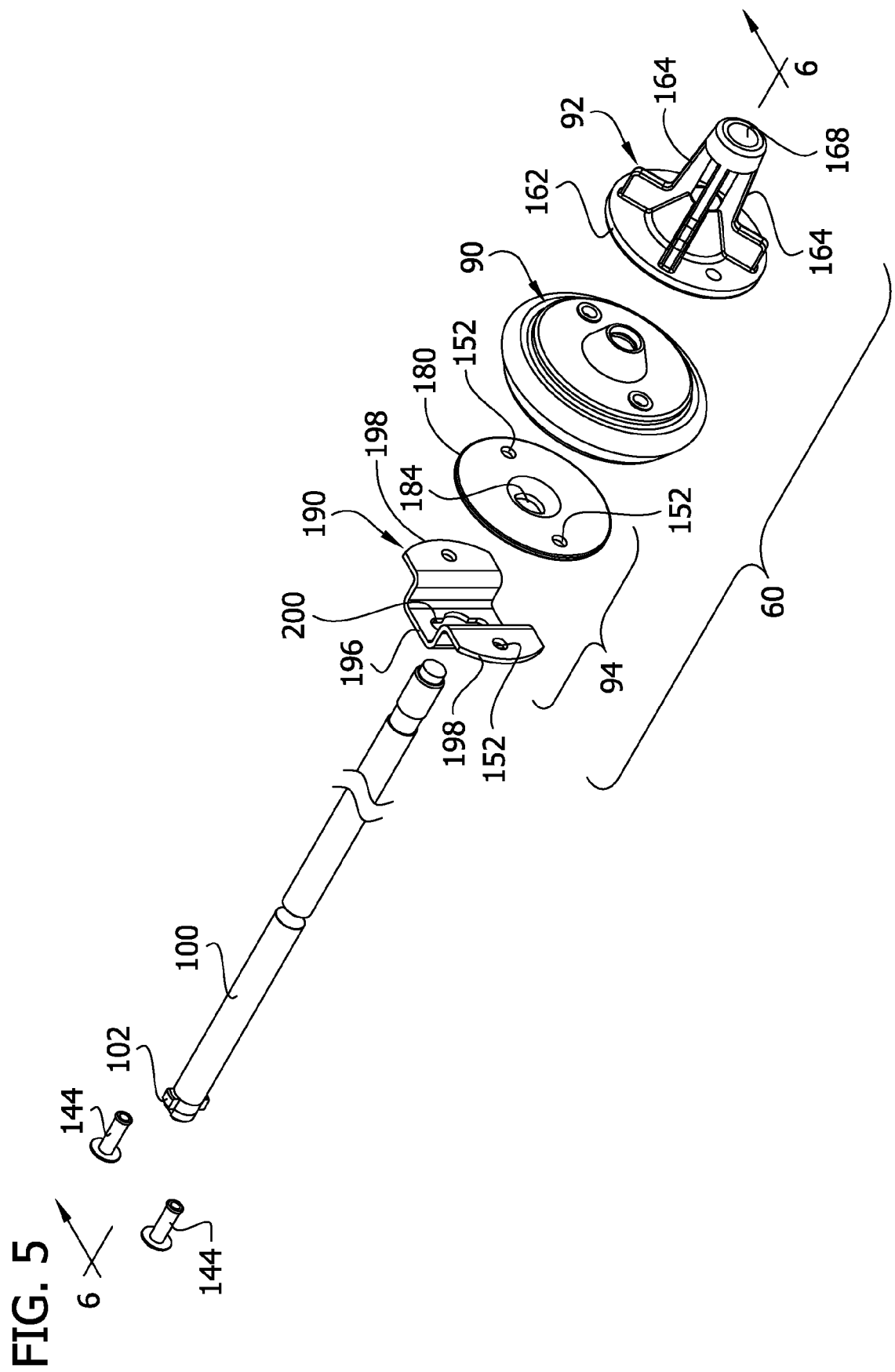
FIG. 5 is an exploded view of the follower packing unit and follower rod.

Referring to the drawings, FIGS. 2-4 show an embodiment of a lever action grease gun, generally designated 20, comprising a container in the form of a barrel 22 defining a lubricant chamber 24 for containing a supply of grease. As shown, the grease is in bulk form but it can be contained in a cartridge, as will be described later. The barrel 22 may be in the form of a metal tube or cylinder, for example. A pump, generally designated 30, is positioned at one end of the barrel constituting its forward end. The pump 30 comprises a head 32 screwed on the forward end of the barrel 22 and having a bore 34 extending transversely with respect to the barrel. This bore 34 forms a pump cylinder, also designated 34. A pump plunger 36 reciprocates in the cylinder 34 and projects out one end of the cylinder (i.e., its rearward end). A hand lever 40 is pin-connected at 42 adjacent one end of the lever to the end of the plunger 36 extending out of the cylinder 34. A link 44 is pin-connected at 46 to this end of the lever 40 and pin-connected at 48 to the pump head 32. The arrangement is such that by swinging the lever 40 away from the barrel 22, the plunger 36 is pulled out of the cylinder 34 through a priming stroke to a retracted position (not shown), and by swinging the lever toward the barrel, the plunger is pushed into cylinder 34 through a pressure stroke to a pressure position (FIG. 3). The pump head 32 is formed with an inlet port 52 through which grease may flow from the barrel 22 into the cylinder 34 when the plunger is in its retracted position. A follower packing unit, generally designated 60, is slidable in the barrel 22 and is biased toward the pump head 30 by a spring 62 for forcing grease from the barrel into the cylinder 34. The forward end of the cylinder 34 is closed by a plug 70. The pump head 30 is formed with a lateral outlet port 74 adjacent the forward end of the cylinder 34. An outlet fitting (not shown) may be screwed in the outlet port 74 for connection of a hose or tube (not shown) through which lubricant can be delivered from the grease gun to a bearing or other device to be lubricated.

The forward end portion of the cylinder 34 is enlarged to provide a forwardly facing valve seat 80 inward of the outlet port 74. A ball valve 82 is biased against this seat by a spring 86 reacting against the plug 70 fitted in the forward end of the cylinder 34.

Referring to FIGS. 5-8, the follower packing unit 60 has a central longitudinal axis 88 and comprises an elastomeric seal 90 of a resilient material sandwiched between a substantially rigid rear structural support 92 and a substantially rigid front structural support 94. The follower packing unit 60 is moved back and forth in the barrel by a follower rod 100 having an engaging element 102 adjacent its front end and a handle 104 at its rearward end. The rod 100 extends rearward through an opening 106 (FIG. 3) in an end cap 108 on the barrel 22. As will be described, the follower rod 100 is rotatable about its own longitudinal axis, coincident with axis 88, to turn the engaging element 102 to different positions allowing selective movement of the follower packing unit 60 in either a forward direction toward the pump head 30 or in a rearward direction away from the pump head. The engaging element is illustrated as a cross pin (also designated 102) extending transversely with respect to the follower rod 100, but it can have other configurations within this invention.

Figure 6:
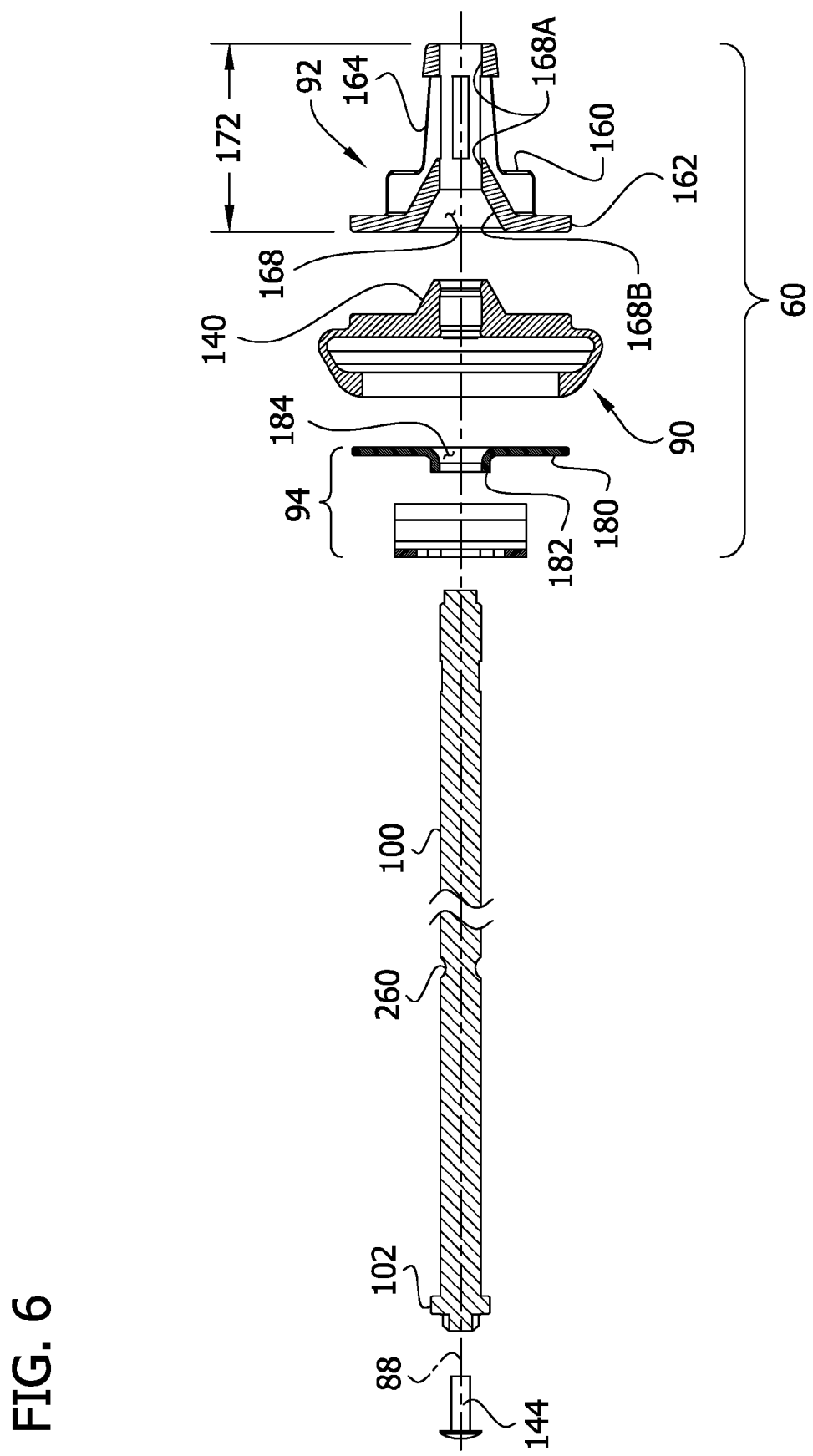
FIG. 6 is an exploded longitudinal section of the follower packing unit and follower rod.
Figure 7:
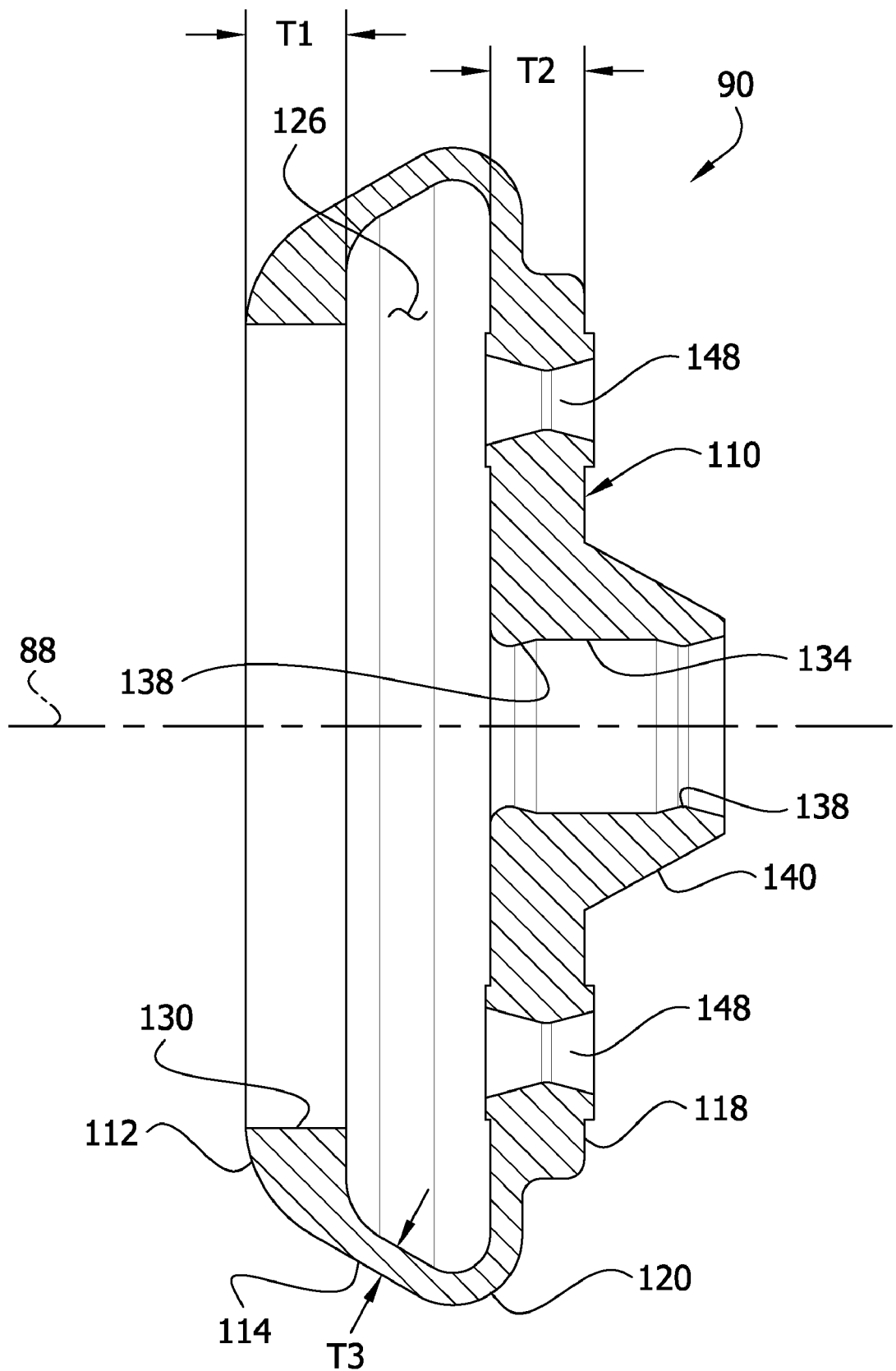
FIG. 7 is a cross sectional view of an elastomeric seal of the follower packing unit.
Figure 8:
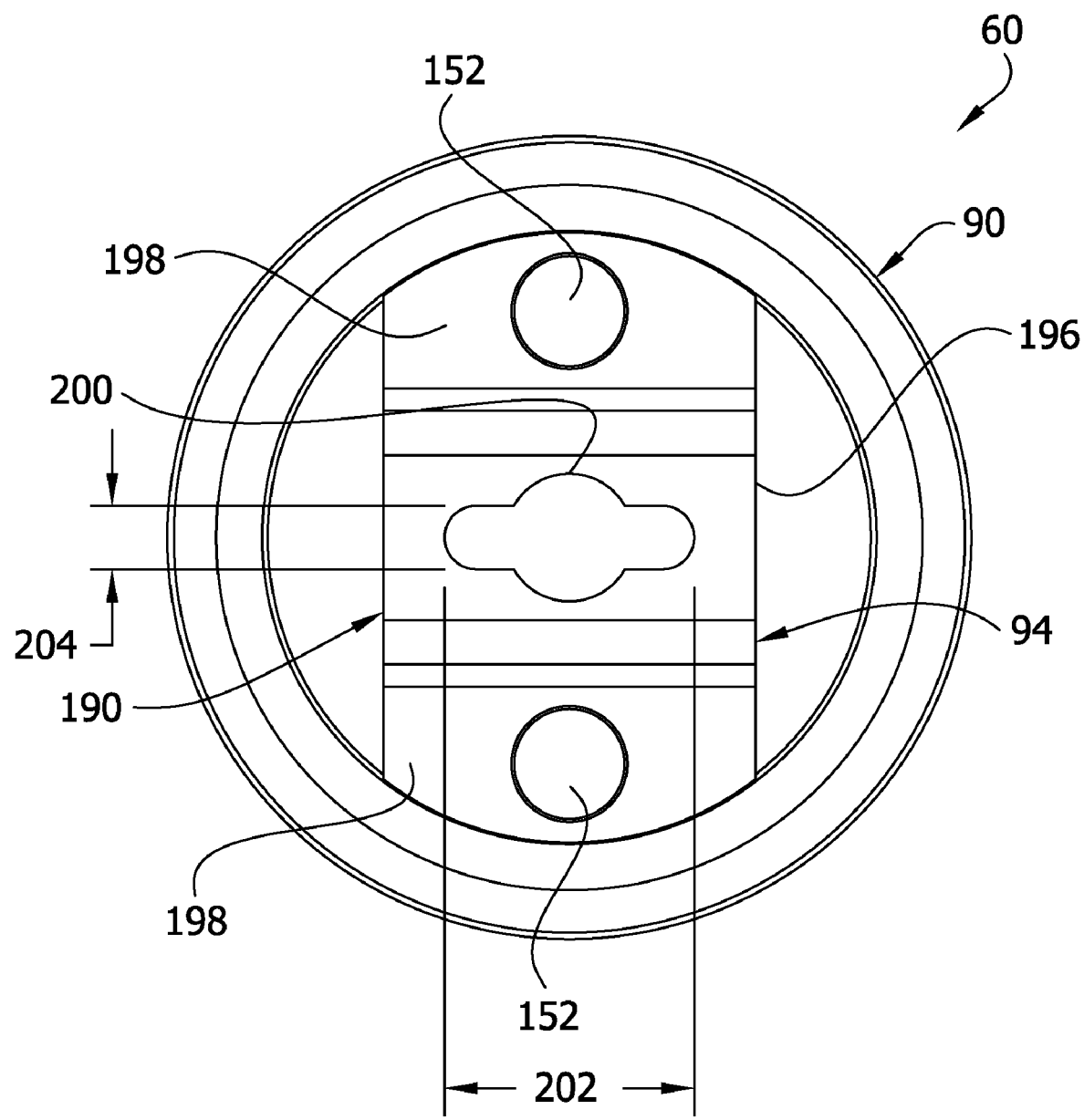
FIG. 8 is a front end view of the follower packing unit.

Referring to FIGS. 6-8, the elastomeric seal 90 comprises a hollow body 110 having a front wall 112, an annular side wall 114, a rear wall 118, and a rounded transition 120 connecting the annular side wall and the rear wall. The front wall, side wall, rear wall and transition define a cavity 126 inside the body. The front wall 112 has a first relatively large-diameter opening 130 for communication of the lubricant chamber 24 with the cavity 126. The rear wall 118 includes a second smaller-diameter cylindrical opening 134 generally aligned with the first opening 130 for receiving the follower rod 100. Two longitudinally spaced annular protrusions 138 are provided in the second opening 134 for sealing against the follower rod. The protrusions 138 form a smaller inside diameter to provide high-pressure contact surfaces for better sealing against the rod. The number of protrusions 138 may vary. The elastomeric seal 90 is desirably integrally formed as a one-piece member of suitable material, such as Buna-N (Nitrile) rubber. The material has a suitable hardness and stiffness sufficient to maintain the general shape of the body (as indicated in FIG. 7) in all modes of operation of the grease gun. By way of example, the material may have a durometer in the range of 60-70, and desirably about 65, as measured on the Shore A scale. Desirably, the front and rear walls 112, 118 have thicknesses T1 and T2, respectively, substantially greater than (e.g., about twice) the thickness T3 of the annular side wall 114 and are thus more rigid than the side wall. The rounded transition 120 has a thickness approximately the same as the side wall 114. The rear wall 118 of the elastomeric seal 90 has a central portion surrounding the opening 134 of increased thickness defining an outside conical sealing surface 140. Rivets 144 extend through two holes 148 in the rear wall and through corresponding holes 152 in the front and rear structural supports 92, 94 (FIG. 8) to hold the components fixed together in a manner preventing separation of the components, the arrangement being such that the elastomeric seal 90, the front structural support 94 and the back structural support 92 form a unitary follower structure movable as a unit in the barrel 22. The number of rivets used to hold the parts in assembly can vary. Other types of mechanical fasteners may be used.

As shown in FIG. 6, the rear structural support 92 comprises an elongate member 160 having a front annular wall 162 and stiffening ribs 164 extending lengthwise of the member. A hole 168 extends longitudinally through the member 160. The hole 168 has a lower generally cylindrical portion 168A which is sized to seal against the follower rod 100 and an enlarged upper portion 168 defined by an inside conical surface (also designated 168B) for sealing against the outside conical surface 140 of the elastomeric seal 90. The length 172 (FIG. 6) of the elongate member 160 is desirably substantially greater than (e.g., about 5 times greater than) the diameter of the lower portion 168A of the hole 168 for providing proper support to the follower rod 100. The rear structural support 92 is of a suitably rigid material such as plastic or metal (e.g., steel). Desirably, the support 92 is of integral, one-piece construction. The rear support 92 can have other configurations.

The front structural support 94 comprises a back support member in the form of an annular base plate 180 having a bushing 182 defining an access hole 184. The hole 184 has diameter larger than the diameter of follower rod 100 but smaller than the length of the cross pin 102. The plate 180 has two rivet holes 152 for the rivets 144. The front structural support 94 also includes a channel-shaped front support member 190 having a front wall 196 spaced from the base plate 180. The front support member 190 also includes flanges 198 which are secured to the base plate 180 by the rivets 144 passing through holes 152 in the flanges 198. A slot 200 is provided in the front wall 196 of the front support member 190. For reasons which will appear, the slot 200 has a length 202 (FIG. 8) greater than the length of the cross pin 102 on the follower rod 100 and a width 204 less than the length of the cross pin. The front structural support 94 is of a suitably rigid material such as plastic or metal (e.g., steel). The front support 94 can have other configurations.

Figure 9:
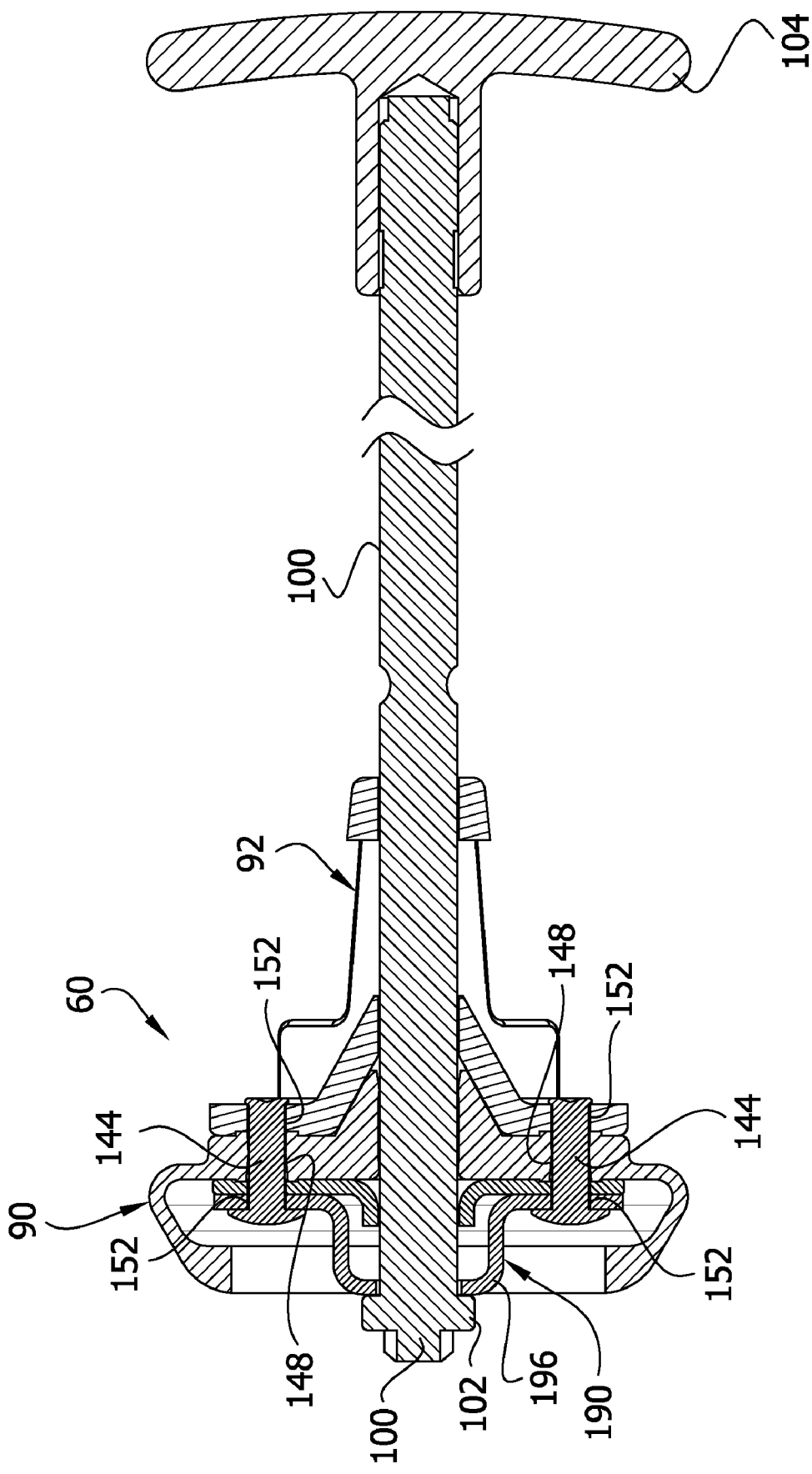
FIG. 9 is a longitudinal section of the follower packing unit showing the follower rod with an engaging element in a loading position.
Figure 10:
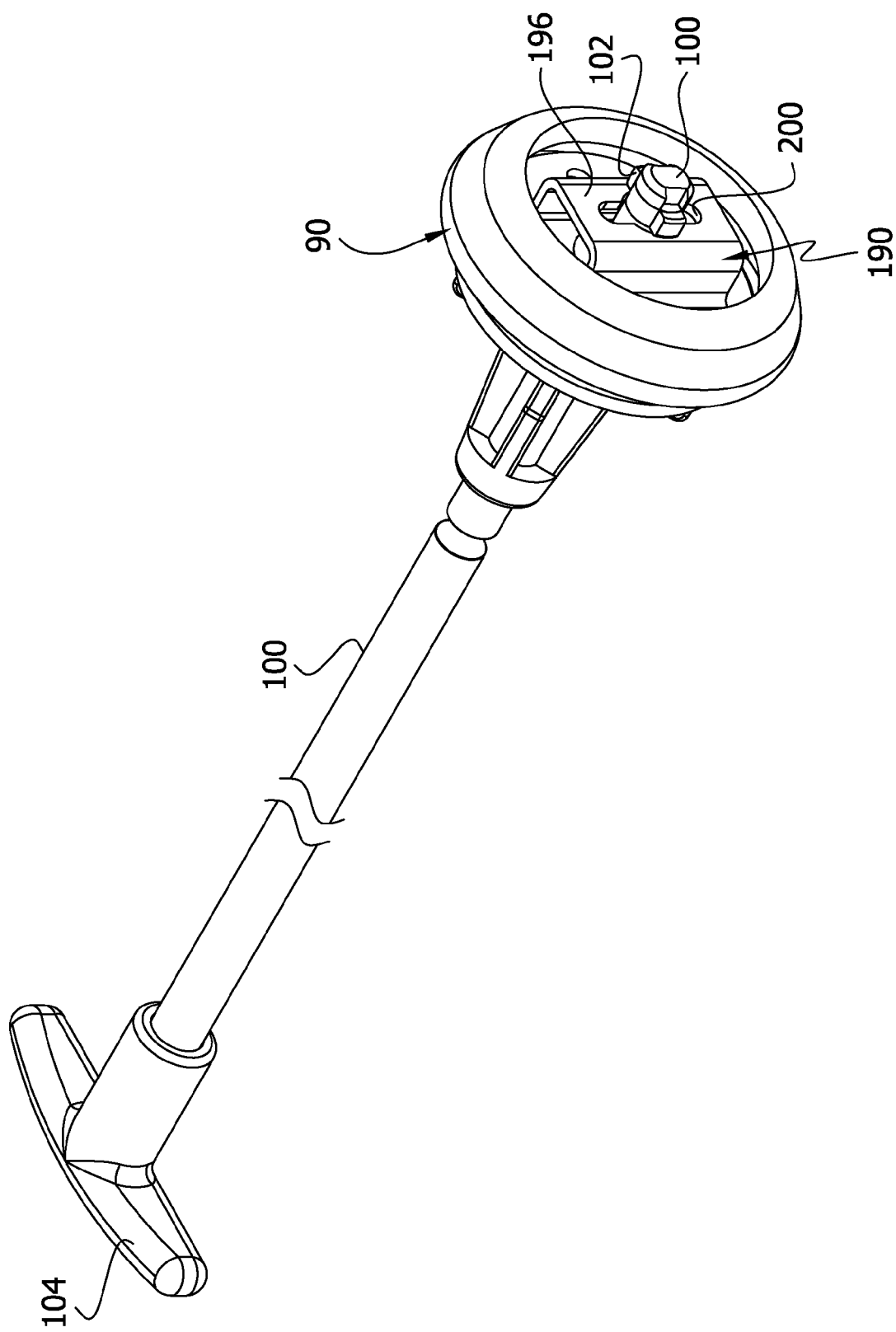
FIG. 10 is a perspective of the follower packing unit and follower rod showing the engagement element in the loading position.
Figure 11:
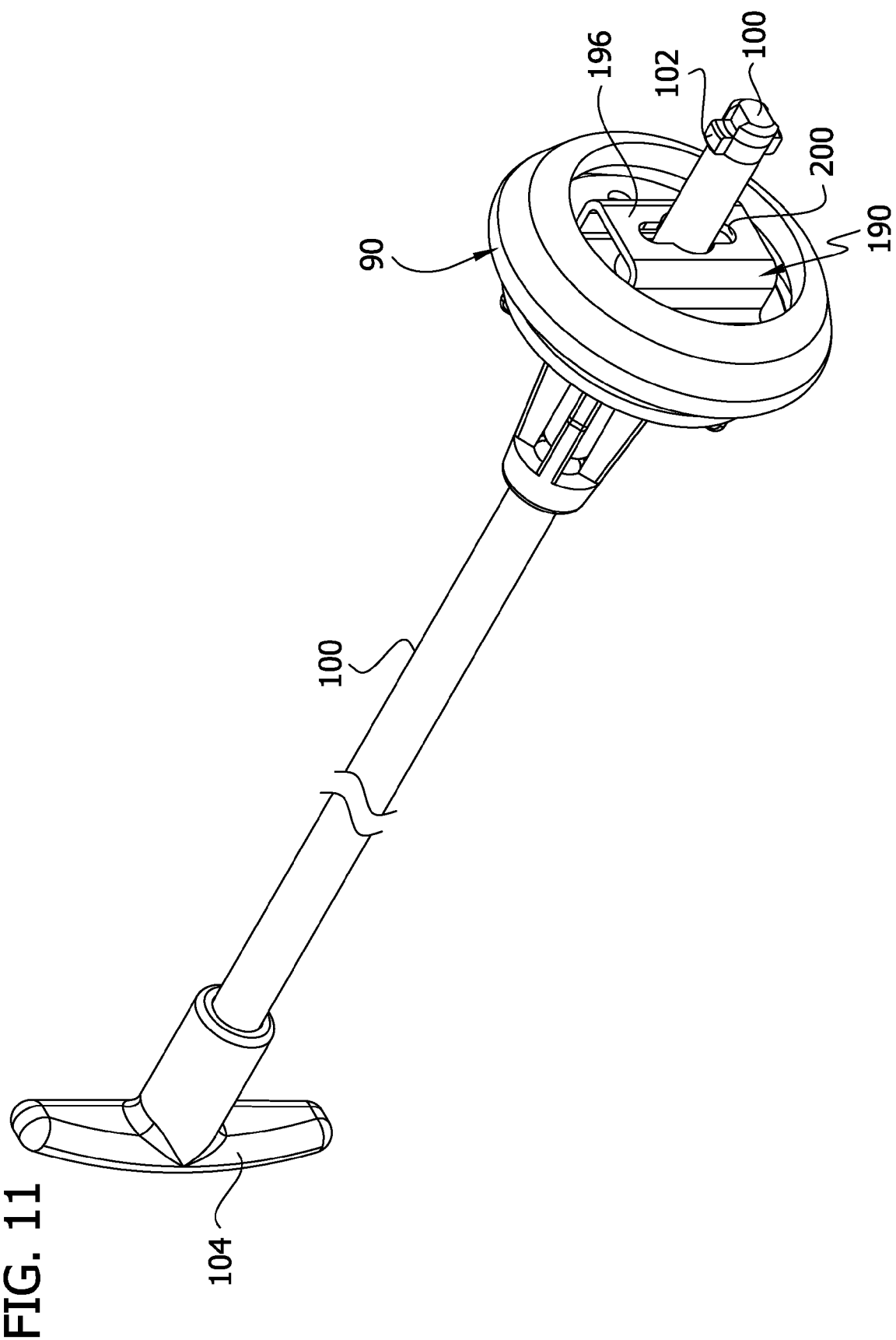
FIG. 11 is a view similar to FIG. 10 showing the engaging element in transition between the loading position and a dispensing position.
Figure 12:
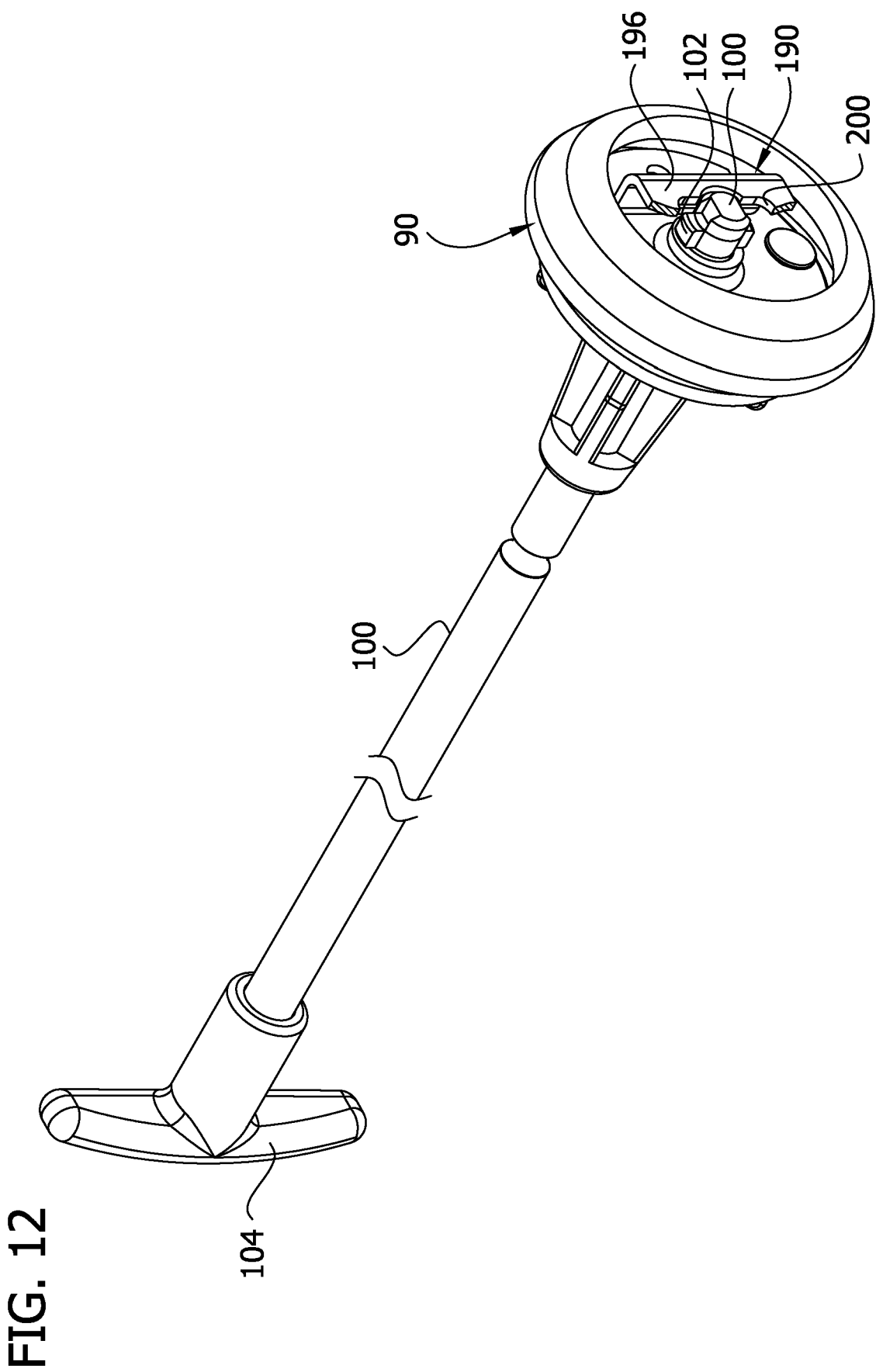
FIG. 12 is a view similar to FIG. 11 showing the engaging element in the dispensing position, portions of the front support being broken away to show details.
Figure 13:
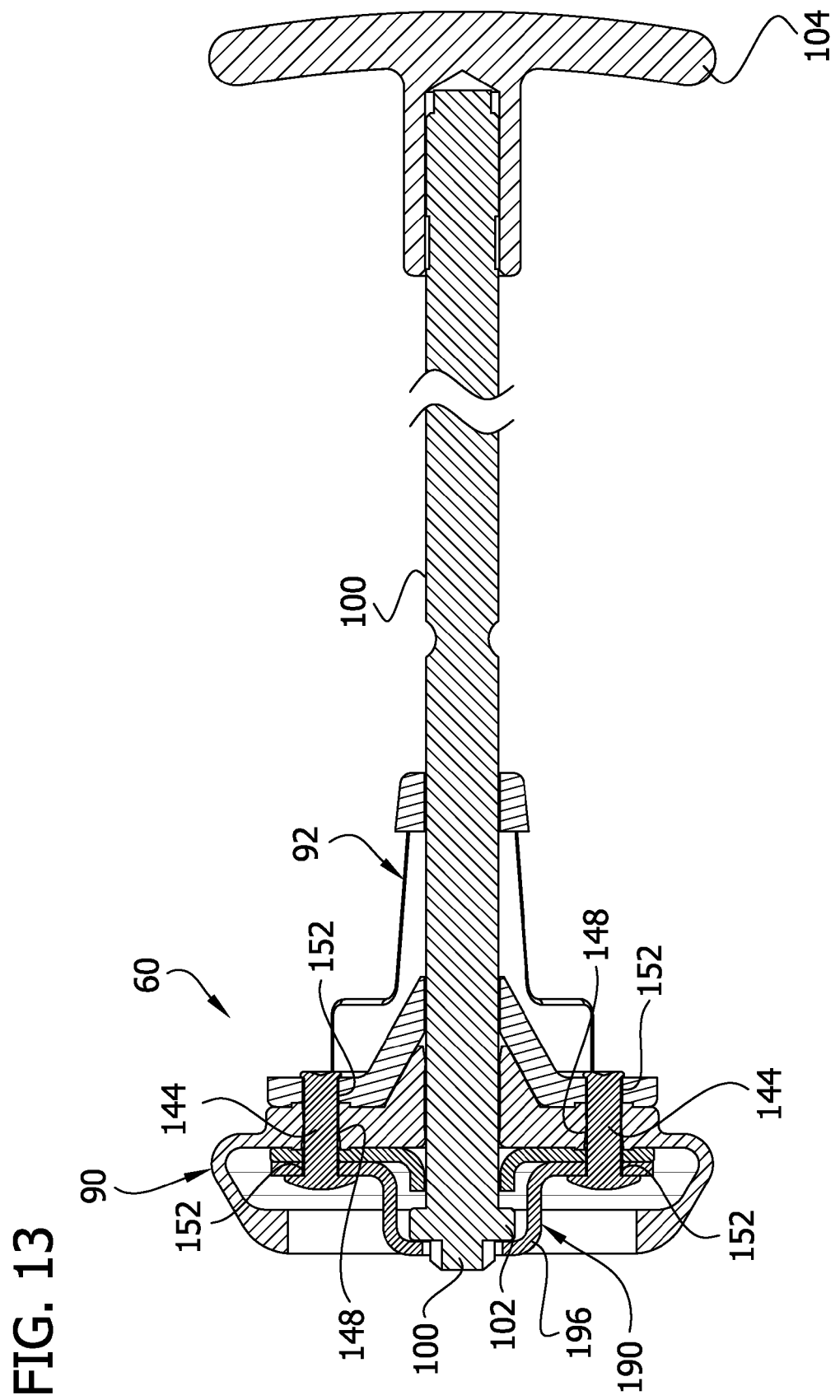
FIG. 13 is a longitudinal section of the follower packing unit showing the follower rod with the engaging element in a dispensing position.

Referring to FIGS. 9 and 10, the follower rod 100 is rotated to a "loading" position in which the cross pin 102 is out of alignment with the slot 200 and in contact with the front surface of the front wall 196 of the front member 190 of the front structural support 94. With the follower rod 100 in this position, the rod is pulled in a rearward direction (to the right in FIG. 4), which causes the entire follower packing unit 60 to move away from the pump head 30 to allow loading of lubricant into the barrel 22, either in bulk or by using a cartridge tube. After loading is complete, the follower rod 100 is rotated on its axis to align the cross pin 102 with the slot 200 (FIG. 11) and then pulled in a rearward direction to move the cross pin through the slot and into the space or gap between the front wall 196 of the front support member 190 and the bushing 182 on the base plate 180, as shown in FIG. 12. The cross pin 102 is sized so that it cannot pass through the access hole 184 in the base plate 180. The follower rod 100 is then rotated to a "dispensing" position (FIG. 13) in which the cross pin 102 is out of alignment with the slot 200 and in contact with the back surface of the front wall 196 of the front support member 190. In this position, a forward force applied to the follower rod 100 will push the entire follower packing unit 60 forward in the barrel 22 or cartridge tube through a priming stroke to expel any air from the lubricant chamber 24. As the follower packing unit 60 moves back and forth in the barrel 22, no direct force is applied to the elastomeric seal 90. Rather, the force is distributed over the front and back support structures 92, 94.

When the follower packing unit 60 is moved in a rearward direction, the relatively rigid rear wall 118 of the body 110 of the elastomeric seal 90 supports the less rigid annular side wall 114. Additional support is provided by the rigid front wall 162 of rear structural support 92. This support maintains the shape of the annular side wall 114 for sealing effective against the leakage of air when the follower packing unit 60 is moved rearward to create a vacuum in the lubrication chamber 24.

When the follower packing unit 60 is in the position shown in FIG. 3, with the lubricant chamber 24 full of grease, and the unit is pushed forward toward the pump head 30 through a priming stroke for expelling any air, the pressure developed in the lubricant chamber 24 and the cavity 126 in the elastomeric seal 90 produces a generally radial outward force on the annular side wall 114 of the elastomeric seal. The annular side wall 114 deforms outward in a generally radial direction under this pressure to form a tighter seal between the side wall and the barrel 22 or the cartridge tube. In addition, a rearward axial force is applied to the rear wall 118. This force causes the conical outside surface 140 of the rear wall 118 to wedge against the mating inside conical surface 168B of the back structural support 92 to increase the sealing force exerted by the annular protrusions 138 against the follower rod 100, thereby providing an exceptionally tight seal between the follower rod and the elastomeric seal 90.

Figure 14:
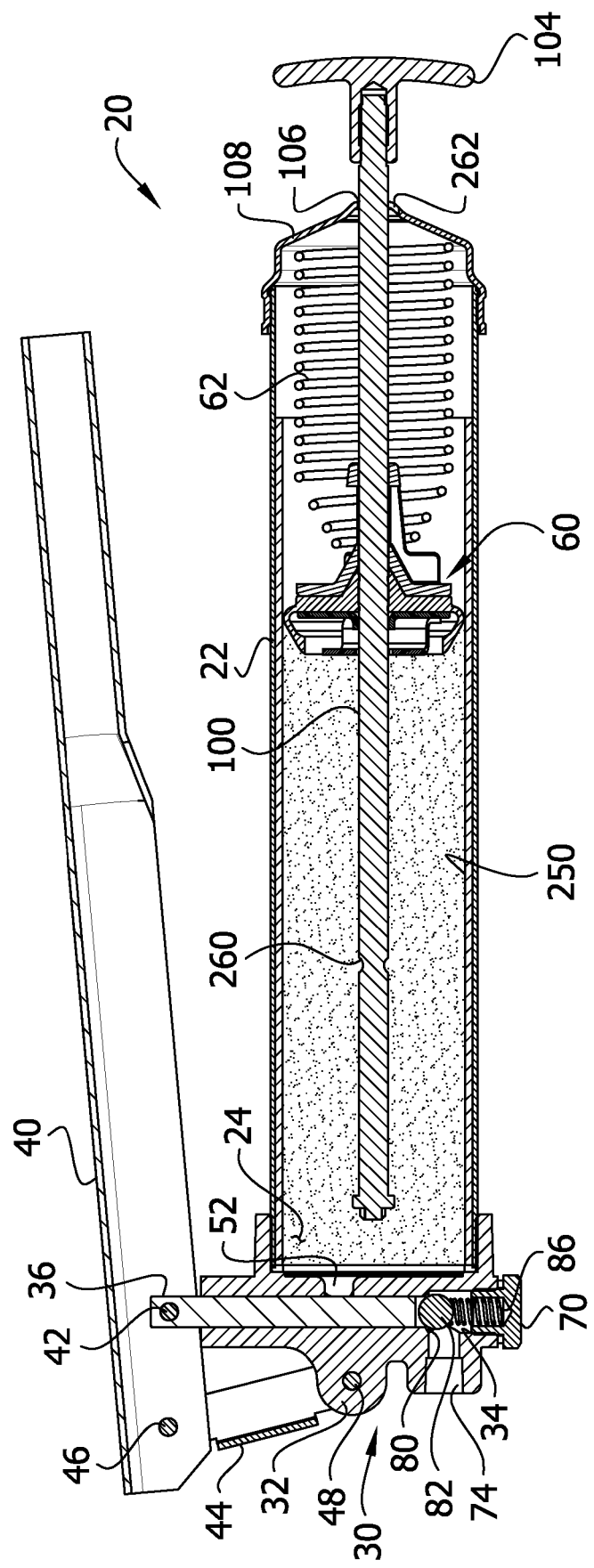
FIG. 14 is a view similar to FIG. 3 showing a cartridge loaded into the barrel of the gun.
Figure 15:
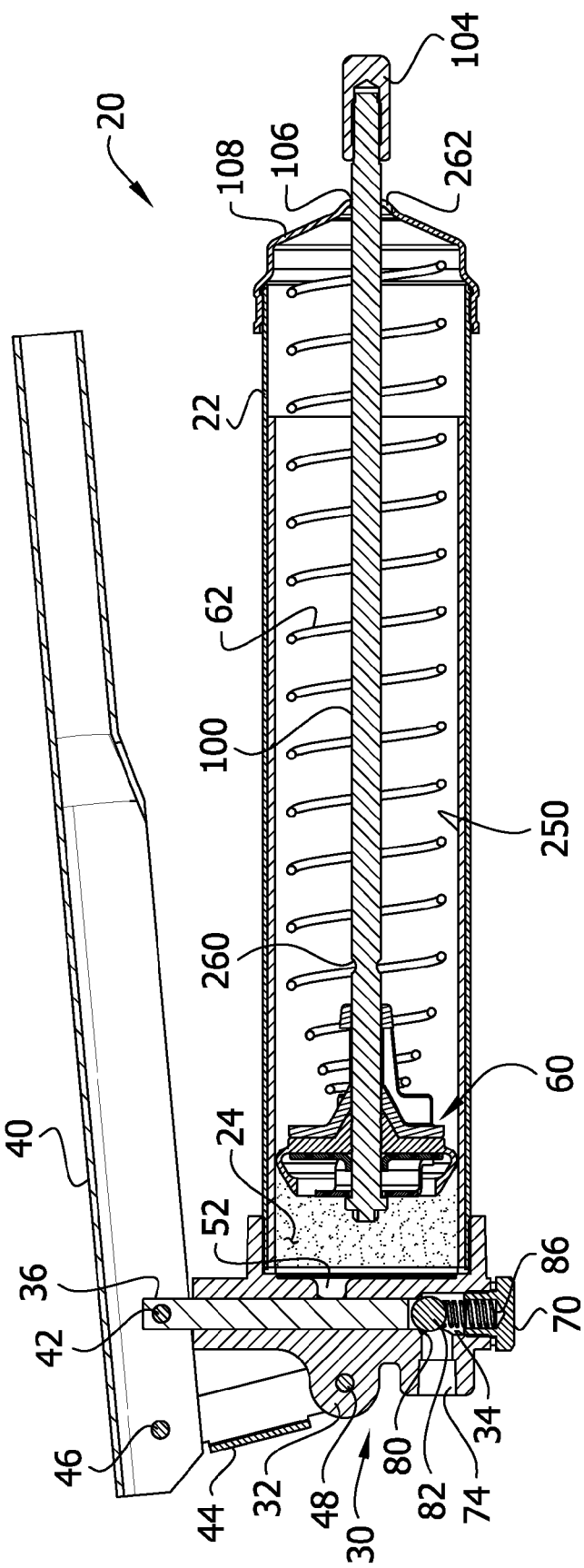
FIG. 15 is a view similar to FIG. 14 but showing the follower packing unit of the gun nearer the pump end of the barrel.

FIGS. 14 and 15 show the gun 20 in use as a cartridge gun, i.e., loaded with a cartridge tube 250 which is filled with grease and which, as supplied, has closure caps (not shown) at its ends. The cartridge 250 has a large opening at one end and a small opening at its other end. To load the cartridge in the gun, the pump head 30 is removed from the barrel 22. The follower rod 100 is moved to its "loading" position and pulled rearward against the bias of the spring 62 to a position in which a grooved portion 260 of the rod is aligned with a lateral extension or notch 262 of the opening 106 in the barrel cap 108. The follower rod 100 is locked in this position by angling the follower rod to move the grooved portion 260 of the rod into the notch. With the follower 100 thus locked, the follower packing unit 60 is held against the bias of the spring 62 in a position adjacent the back end of the barrel 22. After removing the end caps from the cartridge 250, the cartridge is inserted into the pump end of the barrel 22 with the end of the cartridge having the large opening being inserted first.

After the cartridge 250 is loaded, the pump 30 is replaced on the barrel 22, and the follower rod 100 is unlocked from the barrel cap 108 and moved to its "dispensing" position in which the cross pin 102 is out of alignment with the slot 200 and disposed between the front wall 196 of the front support member 190 and the bushing 182 on the base plate 180. The follower rod 100 is then pushed in a forward direction to move the follower packing unit 60 toward the pump 30. As the follower packing unit is pushed forward, the smaller-diameter front wall 112 of the elastomeric seal 90 acts as a lead-in so that the packing unit readily and easily enters the cartridge 250 and comes into sliding sealing engagement with the interior surface of the cartridge to force grease in the cartridge toward the pump 30 without leakage of grease past the elastomeric seal. As the packing unit 60 enters the cartridge, the annular side wall 114 of the elastomeric seal 90 is axially compressed. This compression, in combination with the pressure in the lubricant chamber 24 and cavity 126 of the seal, produces a radial outward force on the side wall 114 to create a tighter seal between the cartridge 250 and the elastomeric seal, and also a rearward axial force to create a tighter seal between the follower rod 100 and the annular protrusions 138 due to the wedging action between the mating surfaces 140 and 168B.

As the follower packing unit 90 moves forward, grease and any air in the cartridge 250 and barrel 22 is forced into the cylinder 34 of the pump 30, causing the ball valve 82 to open, and then through the outlet opening 74 in the pump head 32. The follower rod 100 is then rotated to align the cross pin 102 with the slot 200, pushed forward to move the cross pin through the slot in which the pin is forward of the front wall 196 of the front support member 190 (e.g., to the position shown in FIG. 14), and then rotated to a position in which the cross pin in out of alignment with the slot. The gun is then ready for use, with the spring 62 urging the follower packing unit 60 in a forward direction to move lubricant through the inlet 52 of the cylinder 34 where it is in position for being dispensed through the outlet 74 by using the lever 40.

Alternatively, the gun 1 can be loaded with bulk grease instead of a cartridge, as illustrated in FIG. 2. The gun may be loaded with bulk grease either by utilizing a filling pump to pump grease into the barrel 22 via a filler nipple (not shown) or by removing the pump head 32. Alternatively, the open end of the barrel 22 may be inserted in a container of grease and the follower rod 100 pulled to move the follower packing unit 60 away from pump head to create a suction force drawing grease into the lubrication chamber 24. In this case, the rearward force exerted by the follower rod 100 on the packing unit 60 causes the conical outside surface 140 of the elastomeric seal 90 to wedge against the mating inside conical surface 168B of the rear structural support 92 to create a tighter seal around the follower rod 100. As a result, leakage of air around the follower rod 100 is prevented to maintain the suction in the lubrication chamber 24.

It will be observed from the foregoing that the follower packing unit 60 described above provides a more robust method of sealing in both bulk filling and cartridge applications. The cavity 126 in the elastomeric seal 90 of the follower packing unit receives lubricant under pressure. This pressure creates a generally radial outward force tending to push the side wall 114 more tightly against the grease tube or cartridge 150. The pressure also creates a generally axial rearward force which pushes the outside conical sealing surface 140 of elastomeric seal 90 against the inside conical surface 168B of rear structural support 92 to wedge the annular protrusions 138 of the seal 90 more tightly against the follower rod 100. Also, the surface of the follower rod 100 which engages the sealing protrusions 138 is smooth and uninterrupted over the entire range of movement of the follower packing unit 60 in the barrel 22, which creates a good sliding sealing fit between the rod and the elastomeric seal over the entire range of movement. This construction is in contrast to conventional designs such as shown in U.S. Pat. No. 4,247,023, where the sealing surface between follower rod and the central bore in the packing unit is interrupted by swaged wings 44 on the follower rod which can result in leakage of grease past the follower body.

Experimental results have shown that the present invention can effectively seal grease even after the follower packing unit has been moved through more than 1000 "load and dispense" cycles by applying axial compression and tension forces of at least 40 lbs to the follower rod. The application of tension force during the loading stroke of each cycle was measured to produce a negative pressure in the lubrication chamber of 8-11 psi. Conversely, the application of compression force during the dispensing stroke of each cycle was measured to produce a positive pressure in the lubrication chamber of 9-12 psi. This was validated through repeated experiments and is an improvement over the prior art. Results of tests on conventional grease guns show that an axial compression or tension force of 20 to 35 pounds transmitted to the seal assembly by the follower rod produces only about a 5-10 psi of positive pressure during a dispensing stroke and about 5-8 psi of vacuum during a loading stroke. Further, the sealing capability of the sealing assembly is reduced substantially after 100-200 cycles.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A lubricating gun comprising
a barrel for holding either lubricant in bulk or a tubular cartridge containing lubricant,
a follower packing unit in the barrel,
a follower rod for moving the follower packing unit in the barrel along a longitudinal axis of the barrel,
said follower packing unit comprising
an elastomeric seal comprising a hollow annular body of elastomeric material having a front wall, an annular side wall and a rear wall defining a cavity in the body, a first opening in the front wall allowing entry of lubricant into the cavity under pressure, a second generally cylindrical opening in the rear wall aligned with the first opening such that the follower rod extends through both openings, said rear wall being configured at the second opening for sealing engagement with the follower rod, and at least one annular projection on the rear wall projecting into said second generally cylindrical opening, said annular projection having a diameter smaller than said generally cylindrical opening to provide a concentrated sealing force against the follower rod,
a rigid back structural support for rigidly supporting the rear wall of the elastomeric seal,
a rigid front structural support for rigidly supporting the front wall of the elastomeric seal,
said front and back structural supports having openings therein aligned with the first and second openings in the elastomeric seal for receiving the follower rod, and
one or more fasteners for fastening the elastomeric seal, the front structural support and the back structural support to one another in a manner preventing separation such that the elastomeric seal and front and back structural supports form a unitary follower structure movable as a unit in the barrel,
the annular side wall of the elastomeric seal being resiliently deformable under said pressure in a radial direction for sealing against an interior surface of the barrel or the tubular cartridge,
wherein said rear wall is deformable under said pressure to increase a radial sealing force of the rear wall against the follower rod at said second opening,
wherein the back structural support comprises a elongate member, and
wherein the opening in the back structural support comprises a bore in the elongate member having a cylindrical portion that receives said follower rod and is sized such that the elongate member seals against the follower rod.

2. A lubricating gun as set forth in claim 1 wherein said cylindrical portion of the bore has a length that is greater than a diameter of said cylindrical portion of the bore.

3. A lubricating gun as set forth in claim 1 wherein the front structural support comprises a front support member having a front wall and a back support member spaced rearward from the front wall.

4. A lubricating gun as set forth in claim 3 wherein the follower rod comprises an engaging element adjacent a forward end of the rod, and wherein the front wall of the front support member has a slot, the slot having a length greater than a length of the elongate element and a width less than the length of the elongate element whereby the follower rod can be rotated on its axis to a position in which the engaging element is aligned with the slot to allow movement of the engaging element through the slot in either direction and then rotated on its axis to a position in which the engaging element is out of alignment with slot and contacting said front wall for moving the follower packing unit in the barrel.

5. A lubricating gun as set forth in claim 1 wherein said one or more fasteners are rivets.

6. A follower packing assembly comprising
a follower packing unit adapted for reciprocal movement in a cylinder, and
a follower rod for moving the follower packing unit in the cylinder,
said follower packing unit comprising
an elastomeric seal comprising a hollow annular body of elastomeric material having a front wall, an annular side wall and a rear wall defining a cavity in the body, a first opening in the front wall allowing entry of lubricant into the cavity under pressure, a second generally cylindrical opening in the rear wall aligned with the first opening such that the follower rod extends through both openings, said rear wall being configured at the second opening for sealing engagement with the follower rod, and at least one annular projection on the rear wall projecting into said second generally cylindrical opening, said annular projection having a diameter smaller than said generally cylindrical opening to provide a concentrated sealing force against the follower rod,
a rigid back structural support for rigidly supporting the rear wall of the elastomeric seal,
a rigid front structural support for rigidly supporting the front wall of the elastomeric seal,
said front and back structural supports having openings therein aligned with the first and second openings in the elastomeric seal for receiving the follower rod, and
one or more fasteners for fastening the elastomeric seal, the front structural support and the back structural support to one another in a manner preventing separation such that the elastomeric seal and front and back structural supports form a unitary follower structure movable as a unit in the barrel,
the annular side wall of the elastomeric seal being resiliently deformable under said pressure in a radial direction for sealing against an interior surface of the cylinder,
wherein the back structural support comprises an elongate member, and
wherein the opening in the back structural support comprises a bore in the elongate member having a cylindrical portion that receives said follower rod and is sized such that the elongate member seals against the follower rod.

7. A follower packing assembly as set forth in claim 6 wherein said annular side wall is tapered in a direction toward the front of the body to provide a lead-in facilitating entry of the elastomeric seal into said tubular cartridge.

8. A follower packing assembly as set forth in claim 6 wherein the front wall of the body has a thickness at least about twice as great as a thickness of the annular side wall, and wherein said one or more fasteners extend through one or more holes in the rear wall at one or more locations having said thickness at least about twice as great as the thickness of the annular side wall.

9. A follower packing assembly as set forth in claim 6 wherein the rear wall has a conical surface seated against a mating conical surface of the back structural support whereby said pressure in the cavity causes the conical surface of the rear wall to wedge against the mating conical surface of the back structural support to increase a sealing force exerted by the rear wall against the follower rod.

10. A lubricating gun as set forth in claim 6 wherein the cylindrical portion of said bore has a length that is greater than a diameter of said cylindrical portion of the bore.

11. A lubricating gun comprising
a barrel for holding either lubricant in bulk or a tubular cartridge containing lubricant,
a follower packing unit in the barrel,
a follower rod for moving the follower packing unit in the barrel along a longitudinal axis of the barrel,
said follower packing unit comprising
an elastomeric seal comprising a hollow annular body of elastomeric material having a front wall, an annular side wall and a rear wall defining a cavity in the body, a first opening in the front wall allowing entry of lubricant into the cavity under pressure, and a second opening in the rear wall aligned with the first opening such that the follower rod extends through both openings, said rear wall being configured at the second opening for sealing engagement with the follower rod,
a rigid back structural support for rigidly supporting the rear wall of the elastomeric seal,
a rigid front structural support for rigidly supporting the front wall of the elastomeric seal,
said front and back structural supports having openings therein aligned with the first and second openings in the elastomeric seal for receiving the follower rod, the opening in the back structural support comprising a bore in the elongate member having a cylindrical portion that receives said follower rod and is sized such that the elongate member seals against the follower rod, and
one or more fasteners for fastening the elastomeric seal, the front structural support and the back structural support to one another in a manner preventing separation such that the elastomeric seal and front and back structural supports form a unitary follower structure movable as a unit in the barrel,
the annular side wall of the elastomeric seal being resiliently deformable under said pressure in a radial direction for sealing against an interior surface of the barrel or the tubular cartridge.

12. A lubricating gun as set forth in claim 11 wherein said cylindrical portion of the bore has a length that is greater than a diameter of said cylindrical portion of the bore.

13. A lubricating gun as set forth in claim 11 wherein the rear wall of the body has a thickness at least about twice as great as a thickness of the annular side wall, and wherein said one or more fasteners extend through one or more holes in the rear wall at one or more locations having said thickness at least about twice as great as the thickness of the annular side wall.

* * * * *